United States Patent

[11] 3,540,676

[72] Inventors Jesse M. Madey
Hyattsville;
Xopher W. Moyer, New Carrollton,
Maryland
[21] Appl. No. 785,611
[22] Filed Dec. 20, 1968
[45] Patented Nov. 17, 1970
[73] Assignee The United States of America
as represented by the Administrator of the
National Aeronautics and Space
Administration

[54] REDUNDANT ACTUATING MECHANISM
9 Claims, 5 Drawing Figs.
[52] U.S. Cl. .................................................. 244/1;
9/9; 74/2; 89/1.5; 244/150
[51] Int. Cl. .................................................. B64g 1/00
[50] Field of Search .................................................. 244/1SS,
149, 150; 74/2, 480(Consulted); 89/1.5,
1.5F(Consulted); 9/9

[56] References Cited
UNITED STATES PATENTS
2,840,328  6/1958  Moran .......................... 244/328
3,057,652 10/1962  Geffner et al. ................ 294/83
3,148,846  9/1964  Newton ......................... 244/1
3,174,706  3/1965  Wagner ......................... 244/1
3,286,630 11/1966  Salmirs et al. ................ 102/49.4
3,433,436  3/1969  Mattey .......................... 244/1

Primary Examiner—Milton Buchler
Assistant Examiner—Jeffrey L. Forman
Attorney—R. F. Kempf, E. Levy and G. T. McCoy ABSTRACT: A redundant cable release mechanism wherein spacecraft components such as releasable despin weights and extensible gravity gradient booms are connected by a cable network to the ends of a pivotal elongated release arm which is mounted for pivotal movement upon a central shaft having integrally connected therewith a first crank arm mounted within a housing and forcibly rotated upon ignition of a pair of squibs, members of which impinge against the extended arms of the crank arm, thereby pivoting the crank arm and the elongated release arm to tension the cable network and release the despin weights and extensible booms. A redundant crank arm is interlockingly received by the first crank arm, the second crank arm being rotated by the action of a pair of preloaded coil springs reacting against its extended arms and being initially restrained from rotation by one spring loaded piston engaging the ends of the extended arms, said piston being retracted upon the escape of subliming material through an orifice provided in the piston housing, enabling the crank arm to rotate and thereby actuate the elongated release arm.

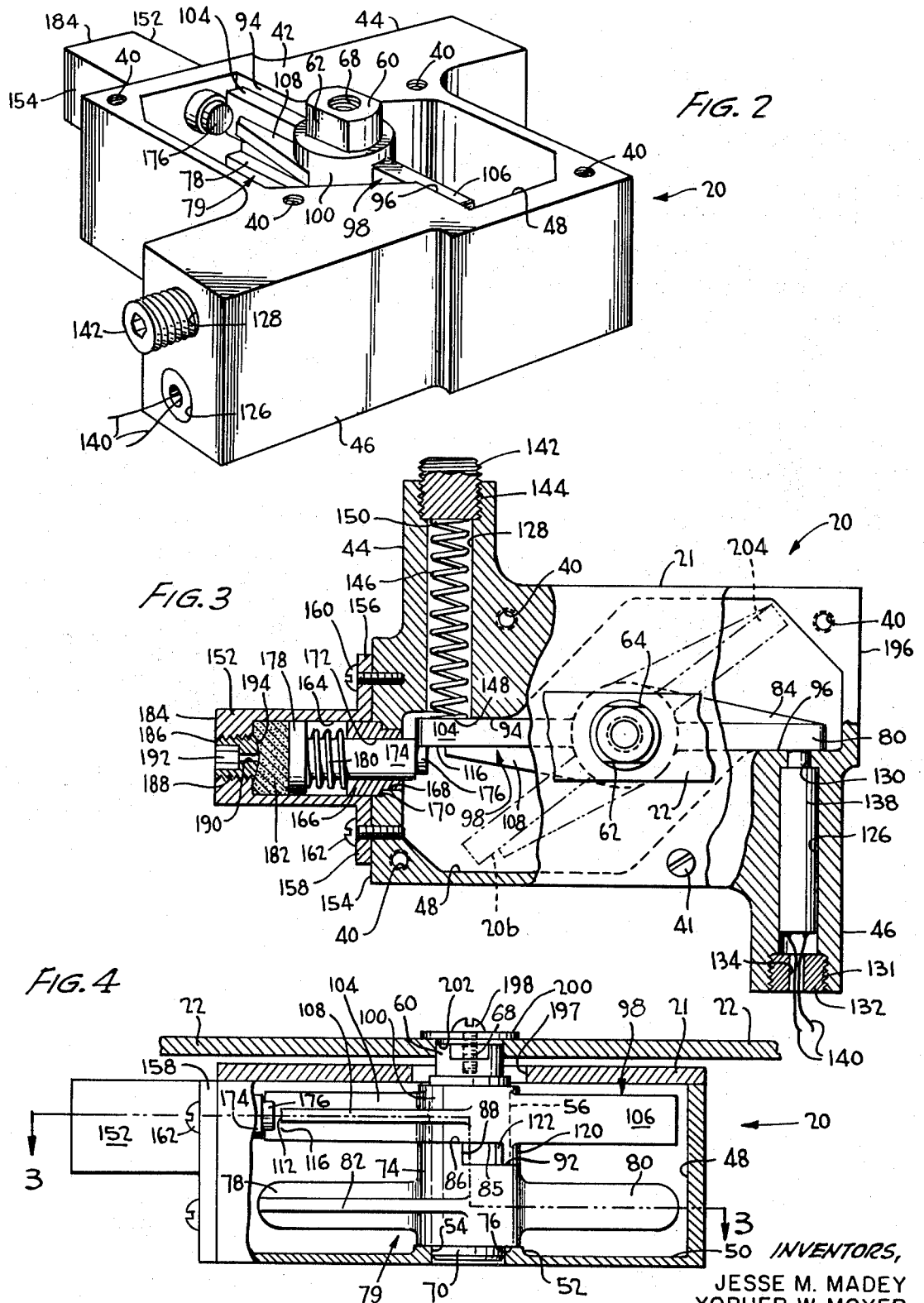

Patented Nov. 17, 1970

INVENTORS,
JESSE M. MADEY
XOPHER W. MOYER

BY
Carl Levy
ATTORNEYS

REDUNDANT ACTUATING MECHANISM

The invention described herein was made by employees of the United States Government and may be manufactured or used by or for the United States Government for governmental purposes without the payment of any royalties thereon or therefor.

The invention relates to a release mechanism, and, more particularly, to a redundant crank arm system for actuating the lever arm of a cable release mechanism enabling deployment of various satellite appendages such as releaseable despin weights and a ball release mechanism associated with an extendible satellite stabilization boom.

Whereas, in the prior art, required pivotal motion of the elongated lever arm has been accomplished by the forces generated by the gas pressure within a pyrotechnic device upon it being fired under command of electronic signals, no provision was made for pivoting the lever arm by an alternate or redundant mechanical system should the pyrotechnic system fail to operate. Accordingly, a preferred embodiment of the invention provides both a pyrotechnic system and a redundant mechanical system to insure the required actuation of a pivotal lever release arm, thereby providing necessary operative forces in the release of requisite satellite appendages as described.

More particularly, a preferred embodiment of the invention comprises a first crank arm secured to a lever arm and initially retained in a stopped position against a containing housing provided with a plurality of bores receiving squibs, the internal gas pressure produced by the firing results in the squibs being directed upon the outer extremities of the crank arm causing it to revolve and actuate the lever arm. The preferred embodiment additionally includes a second crank arm similar in construction to the first crank arm and mounted in the housing in interlocking relationship with the first crank arm. The second crank arm is operable by a specific mechanical system, to be hereinafter described in detail, to provide a redundant mechanism for pivoting the lever arm should the pyrotechnic squib firing system fail to operate.

The mechanical system for actuating the second crank arm includes a compressed spring abutting each extremity of the second crank arm, which arm is fixedly retained in a cocked condition against the action of the compressed springs by a slidable, spring loaded piston overlying one end portion of the arm extremity. A piston protrudes from a chamber provided on the housing, which chamber is initially packed with a subliming solid material, such as methylene chloride. The chamber is capped by an end plug provided with an orifice through which the solid material escapes to the atmosphere. As a satellite, embodying the present invention, attains the near-vacuum outer space environment, the sublimable material continues to be expended through the orifice at a rate prescribed by careful selection of the orifice size. The spring loaded piston slidably withdraws into its chamber as the sublimable substance is expended until it has been retracted sufficiently to disassociate itself from the extremity of the second crank arm, thereby permitting the crank arm to rotate under the reaction of the compressed springs. The rotational motion is transmitted to pivoting the lever arm. Such pivotal motion can be exactly timed by controlling the rate at which the subliming material is expended. Accordingly, the invention provides a completely mechanical system for actuating a cable release mechanism.

Accordingly, it is an object of the invention to provide a release mechanism with a first actuating mechanism and a second, entirely mechanical, actuating mechanism.

Another object of the invention is to provide a rotatable shaft with a first crank arm rotatably actuated upon firing of a pyrotechnic device and a second crank arm which is actuated to impart rotation to the shaft should the pyrotechnic device fail to operate.

Yet another object of the invention is to provide a release mechanism which is actuated upon the operation of a pyrotechnic device or, alternatively, by a purely mechanical mechanism.

Still another object of the invention is to provide a release mechanism, the actuation of which may be precisely timed by the rate at which a subliming substance is dissipated to the atmosphere.

A further object of the invention is to provide a release mechanism which is actuated upon the operation of pyrotechnic devices or, alternatively, upon the escape of subliming materials.

Still a further object of the invention is to provide structure for actuating a release mechanism, such structure including subliming material for precisely timing the actuation of the release mechanism and mechanical restraining and energy storage devices for forcibly actuating the release mechanism.

Other objects and many of the attendant advantages of the present invention will become clear upon a perusal of the following detailed description taken in conjunction with the accompanying drawings, wherein:

FIG. 2 is a perspective of a housing for receiving a redundant actuating mechanism for the release arm illustrated in FIG. 1, and with the top cover of the housing removed to particularly illustrate the crank arms of the mechanism;

FIG. 3 is a plan view of the housing illustrated in FIG. 2, with parts broken away to illustrate in section the particular actuating mechanism contained by the housing, the section being taken along the line 3-3 of FIG. 4;

FIG. 4 is an elevation of the housing as shown in FIG. 2, and with parts broken away to illustrate in section the relationship of the crank arms according to the invention together with the release arm.

Figure 1:
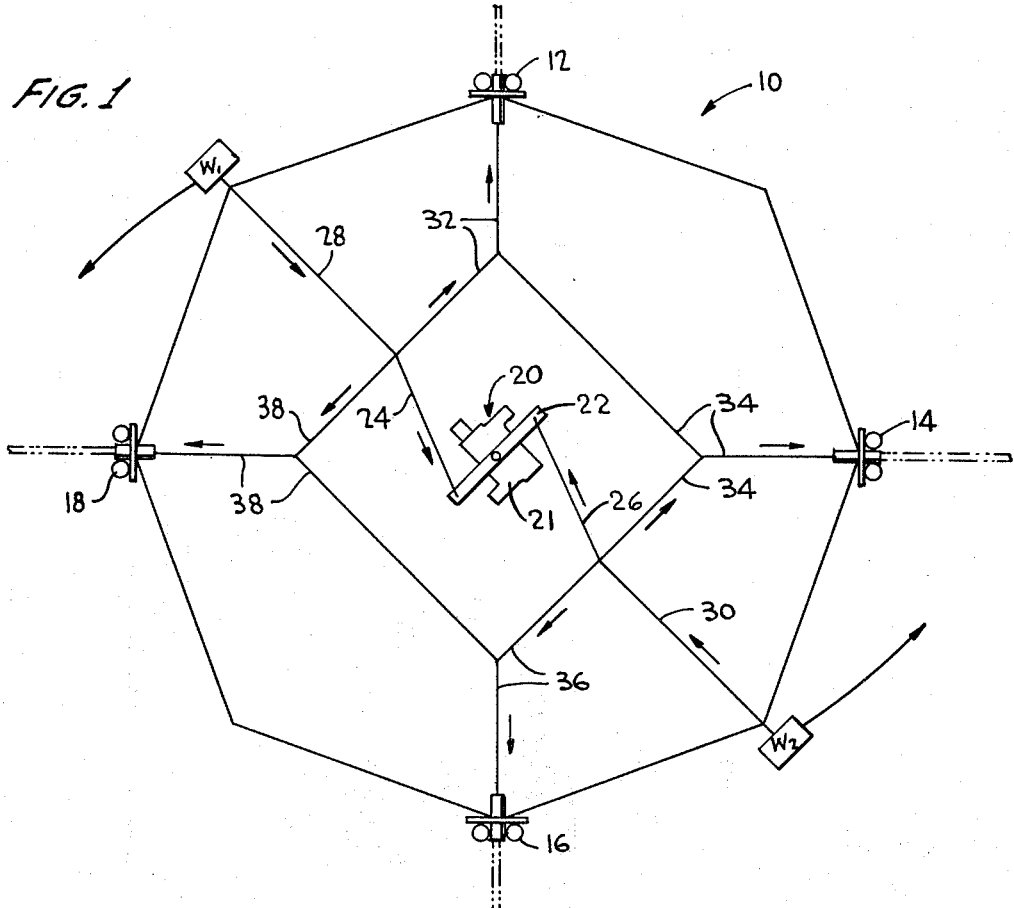
FIG. 1 is a plan view generally illustrating a spacecraft embodying the release arm and actuating mechanism of the present invention.

With more particular reference to FIG. 1 of the drawings, there is shown generally at 10 a spacecraft provided with releasable despin weights W1 and W2 and extendible booms, 12, 14, 16 and 18, respectively. A housing for the redundant release mechanism according to the present invention is indicated generally at 20 and is connected to the spacecraft 10 by any well known means. Associated with the housing 20 is a removable top cover 21 and an elongated lever release arm 22 (shown in more detail in FIG. 4) connected by a pair of cables 24 and 26 to cables 28 and 30, connecting the cables 24 and 26, respectively to the despin weights W1 and W2. Additional cables, such as the cables 32, 34, 36 and 38 connect the cables 24 and 26 to the extendible booms 12, 14, 16 and 18. As well understood in the prior art release of the despin weights W1 and W2 occurs upon rotation of the lever release arm 22, in a counterclockwise direction as illustrated in FIG. 1, tensioning the cables 28 and 30. Subsequent to such rotation, as well understood, the cables 32, 34, 36 and 38 are caused to slack, thereby releasing locking mechanisms (not shown) associated with the extensible booms 12, 14, 16 and 18, thereby enabling the booms to be extended by techniques as practiced in the prior art.

With more particular reference to FIG. 2 of the drawings, the redundant release mechanism housing 20, as illustrated in FIG. 1, is shown in perspective with its top cover removed. A plurality of threaded bores 40 are provided on the top surface 42 of the housing 20 for receiving cap screws, one of which is shown at 41 in FIG. 3, which screws secure the top cover 21. As shown in FIGS. 2 and 3, the housing 20 is generally rectangular and is provided with appended, laterally extended, integral leg portions 44 and 46 respectively. Additionally, the housing 20 is provided with an interior cavity 48, generally of S-shaped configuration, as illustrated in FIGS. 2 and 3. With a more specific reference to FIG. 4, the cavity 48 is further defined by a bottom wall 50 of the housing 20, the bottom wall being provided with a centrally located, upwardly directed boss 52 having a central bore 54 provided therein.

Figure 5:
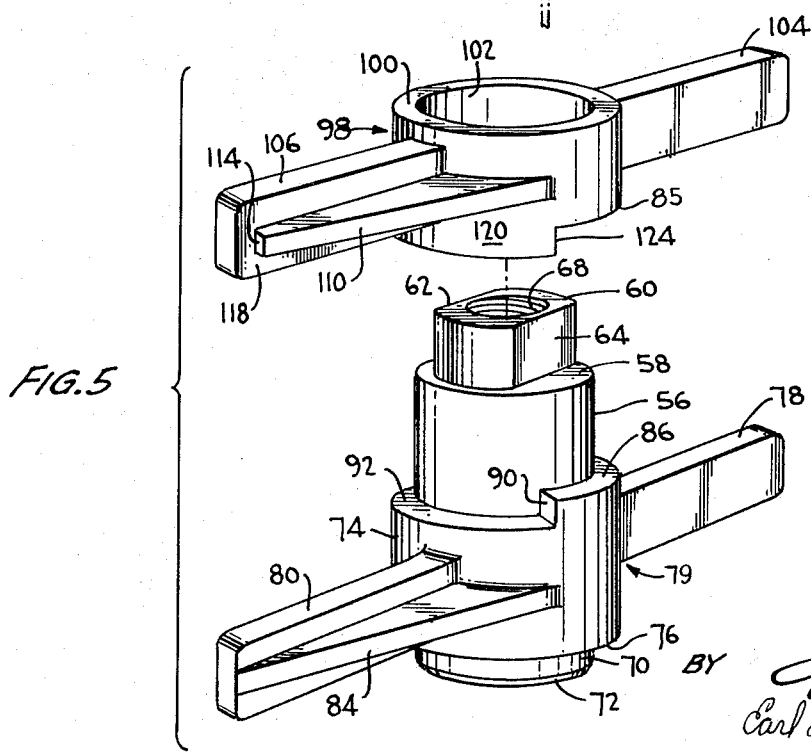
FIG. 5 is a perspective of reverse surfaces of the crank arms as illustrated in FIG. 4 and particularly illustrating the interlocking relationship of the arms.

With reference now to FIGS. 4 and 5, a generally cylindrical shaft 56 is provided at its upper end 58 with an integral bolt head 60 provided with two opposed parallel flat lateral surfaces 62 and 64. The bolt head is provided additionally with a central threaded bore 68 for a use to be hereinafter described. The lower end of the shaft 56 is provided with a reduced end portion 70 having a beveled edge 72 thereon. The reduced end portion 70, as shown in FIG. 4, is received for rotation within the bore 54 of the boss 52.

With reference again to FIGS. 4 and 5, the shaft 56 is provided with a central enlarged cylindrical portion 74, defining a downwardly directed, generally annular shoulder 76 adjacent to the reduced cylindrical end portion 70. With the reduced end portion 70 mounted for rotation in the bore 54 of the boss 52, the shoulder 76 impinges against the top surface of the boss 52. The enlarged cylindrical portion 74 defines a hub which is provided with integral, opposed, laterally extended arms 78 and 80, the combination thereof being referred to as a first crank arm 79. The arm 78 is provided with a web 82 and the arm 80 is provided with a web 84, the webs 82 and 84 integrally secured to their respective arms and the hub 74.

With more specific reference to FIGS. 4 and 5, the hub 74 is provided with a generally annular upwardly directed bearing surface 86 partially surrounding the shaft 56 and, as shown in FIG. 4, terminating in a first shoulder 88, and, as shown in FIG. 5, a second shoulder 90, each of said shoulders defining therebetween a semiannular recessed top bearing surface 92, the surfaces 92 and 86 together comprising the upwardly directed end of the hub 74 surrounding the shaft 56.

As shown in FIG. 2 and 3, the arms 78 and 80 are respectively stopped against land portions 94 and 96 formed by the sidewall of cavity 48 and adjacent the appended leg portions 44 and 46 of the housing.

With reference to FIGS. 2 through 5, a second crank arm 98, similar in construction to the first crank arm 79 provided on the shaft 56, is provided with a hub 100 having a central bore 102 therein, the upper portion of the shaft 58 being received in the bore 102. The crank arm 98 is provided with two opposed, laterally extending arms 104 and 106 mounted to the hub 100 and provided with webs 108 and 110 respectively. Each of the webs 108 and 110 do not extend to the extremities of their respective arms 104 and 106, but terminate abruptly at 112 and 114 to leave bearing surfaces 116 and 118 at the extremities of the arms 104 and 106, respectively, for a purpose to be hereinafter described in detail. The lowermost portion of the hub 100 is provided with an inverted vertically projecting semiannular collar 120 terminating in a shoulder 122, shown in FIG. 4, and another shoulder 124, shown in FIG. 5. With the crank arm 98 receiving the shaft 56, it can be seen upon inspection of FIGS. 2, 3 and 4, the crank arm 98 is received within the internal cavity 48 of the housing 20, the arm 104 thereof being initially stopped against the land portion 94 and the arm 106 being stopped against the land portion 96. Additionally, upon a perusal of FIG. 4, it can be seen that the shoulder 122 of the crank arm 98 is initially spaced in relationship with the shoulder 88 of the hub 74. The lower surface 85 of the hub 100 on the crank arm 98 abuts against the bearing surface 86 of the hub 74 (see FIG. 5) and the lower surface of the collar 120 of the crank arm 98 abuts against the top surface 92 of the hub 74 (see FIGS. 4 and 5). With further reference to FIG. 5, the shoulder 124 of the crank arm 98 is opposed in close fitting adjacent relationship with the shoulder 90 of the hub 74 when the crank arm 98 is mounted for rotation upon the hub 56.

With more particular reference being directed to FIG. 2, the appended leg portion 46 of the housing 20 is shown provided with upper and lower bores 128 and 126 respectively. In similar fashion, not shown, the leg portion 44 is provided with a similar pair of upper and lower bores. With reference to FIG. 3, a more specific illustration of the leg portion 46 of the housing 20 is illustrated in section to show the particular structure of the bore 126 provided therein. The bore 126 is provided at one end thereof with a reduced diameter orifice 130 connecting the bore 126 with the interior cavity 48 of the housing 20 and extending through the land portion 96 defined by the sidewall of the interior cavity 48. As shown, the extended arm 80 provided on the shaft 56 is initially positioned in a stopped position against the land portion 96 and covers the orifice 130. At its terminal end, the bore 126 receives the enlarged diameter plug 132, having a central aperture 134 extending therethrough and threadably secured at 131 in an enlarged terminal end portion of the bore 126. Suitably disposed and encased within the bore 126 is a well known pyrotechnic device, such as a squib 138, provided with terminals 140 protruding through the aperture of the end plug 132 for attachment to any well known squib firing mechanism.

With reference yet to FIG. 3, the particular construction of the leg portion 44 of the housing 20 can be seen illustrated in section to specifically expose the bore 128 which extends through the leg portion 44 and protrudes through the land portion 94 defined by the sidewall of the interior cavity 48 of the housing 20. As shown in that FIG., the extended arm 104 of the crank arm 98 is initially retained, in a manner to be hereinafter described, in a stopped position against the land portion 94, covering the end of the bore 128. At its terminal end, the bore 128 is capped by an enlarged diameter threaded plug 142 threadably secured at 144 in an enlarged end portion of the bore 128. A coil spring 146 is retained initially in a compressed state with one end 148 thereof impinged against the extended arm 104 of the crank arm 98, and its other end 150 impinged against the enlarged threaded plug 142.

With reference to FIGS. 3 and 4 of the drawing, a piston housing 152 is secured to a side wall 154 of the housing 20, thereby forming an elongated appendage to the housing 20 extending in a direction 90° with respect to the laterally extending leg portion 44 of the housing 20. As shown, the piston housing 152 is generally of rectangular configuration and provided with two laterally extending flanges 156 and 158 attached to the sidewall 154 of the housing 20 by machine screws 160 and 162, respectively. The piston housing 152 is provided with a generally cylindrical interior chamber 164 which surrounds a generally cylindrical bushing 166. The bushing 166 protrudes from the piston housing 152, the protruding portion of which is received by a stepped diameter aperture 168 provided in the sidewall 154 of the housing 20. The cylindrical bushing 166 is provided with a generally annular shoulder 170 which coacts with a complementary configuration of the aperture 168 to seat the bushing in the sidewall 154 of the housing 20.

An internal bore 172 of the bushing 166 slidably supports a cylindrical piston 174. As shown in FIGS. 3 and 4, the piston 174 is provided with a reduced diameter cylindrical head 176. Initially, the piston 174 is mounted in the bushing 166 with its reduced diameter head 176 overlapping the end of the extended arm 104 of the crank arm 98 and impinging against the bearing surface 116 of the arm 104. The opposite end of the piston 174 extends into the piston housing 152 and is provided with an enlarged diameter, generally cylindrical head 178 slidable within the bore 164 of the piston housing 152. The portion of the piston 174 extending into chamber 164 of the piston housing 152 is surrounded by a compressed coil spring 180, one end of which engages the end of the bushing 166, and the other end impinges against the enlarged, generally cylindrical head 178 of the piston 174. The remainder of the chamber 164 of the piston housing 152 is initially packed with a solid subliming substance 182, for example naphthalene chloride, a sufficient volume of which is provided to retain the piston 174 in its initial position, as illustrated in FIGS. 3 and 4, against the action of the compressed coil spring 180.

With respect to FIGS. 2 and 3, the piston housing 152 is provided at its outwardly directed terminal end 184 with a plug 186 of a diameter relatively smaller than the diameter of the cylindrical bore 164 provided in the piston housing 152. The plug 186 is threadably secured at 188 in the end 184 of the piston housing 152 and is provided with an orifice 190, extending centrally along its major axis and providing a venting passageway for the subliming material 182 to the outside atmosphere surrounding the piston housing 152. The plug 186 is additionally provided a hexagonal recess 192 in communication with the passageway 190 for receiving an appropriate Allen wrench utilized for inserting or removing the plug 186 from the end wall 184 of the piston housing 152. The terminal end 194 of the plug 186 protrudes into the cylindrical bore 164 of the piston housing 152 and is of frustoconical configuration, such configuration enabling the terminal end 194 to be partially embedded in the subliming material 182 when the plug 186 is assembled in the end 184 of the piston housing 152.

Although not shown in the drawings, for clarity, it should be understood that a sidewall 196 of the housing 20, which is in opposed parallel relationship with the sidewall 154, may also be provided with a piston housing 152 and the associated structure for retaining the corresponding arm 106 of the crank arm 98 in stopped position against the land portion 96 of the housing 20.

With reference to FIGS. 2, 3 and 4 the rotatable shaft 56, provided with the extended arms 78 and 80, is mounted on the upstanding boss 52, the arms 78 and 80 being initially in stopped positions against the land portions 94 and 96, respectively; and the crank arm 98 is mounted over the shaft 56, the extended arms 104 and 106 being retained initially in stopped positions against the land portions 94 and 96, respectively, by the projecting piston head 176, as above described. As shown in FIGS. 3 and 4, the cover plate 21 is then secured to the top surface 42 (see FIG. 2) of the housing 20 by the cap screws 41 secured within the threaded holes 40.

As shown in FIG. 4, the cover plate 21 is provided with a central aperture 197 for receiving the enlarged bolt head 60 which projects therethrough. Next, the elongated lever release arm 22, by a machine screw 198, is threadably secured to the threaded bore 68 of the bolt head 60, a washer 200 overlying the lever release arm 22 to provide sufficient bearing surface for the machine screw 198. The lever release arm 22 is provided with an inverted recess 202 of complementary configuration to the shape of the bolt head 60 for matingly engaging the arm 22 in mounted relationship with the bolt head 60.

As shown in FIG. 1, the thus assembled structure is secured, according to any suitable technique, to the spacecraft 10. By way of example, the tension cables 24 and 26 are then secured in any well known manner to the ends of the lever release arm 22.

In operation, reference will be made particularly to FIGS. 1, 3 and 4 wherein the housing 20 is mounted suitable upon the surface of a spacecraft, generally illustrated at 10, and the cable network, comprising the cables 24, 26, 28, 30, 32, 34, 36 and 38, is suitably secured to the ends of the rotatable arm 22, as illustrated specifically in FIG. 1. At the prescribed time, an electronic signal from a ground control station (not shown) is relayed to the spacecraft 10 and an electronic signal is generated and supplied to the terminal wires 140 of the squibs 138 causing them to fire. With reference to FIG. 3, upon firing of squibs 138 a plunger (not shown) in each of them is forced outwardly by internal gas pressure and impinges against the extended arms 78 and 80 of the rotating shaft 56, causing it to rotate to the position generally shown in phantom at 204 in FIG. 3. With specific reference being made to FIG. 4, the shaft 56 will rotate upon pivotal motion of the arms 78 and 80 without moving the extended arms 104 and 106 of the crank arm 98, the space between the face 88 of the shaft 56 and the adjacent surface 122 of the crank arm 98 permitting such rotation of the shaft 56. The surfaces 86 and 92 of the hub 74 act as bearing surfaces to allow relative movement between the crank arm 98 and the hub. Upon such rotation of the shaft 56, the lever arm 22, as illustrated in FIG. 1, will be rotated counterclockwise and impart tension to the cables 24 and 26. In turn, the cables 28 and 30 are tensioned and translate somewhat, which releases the despin weights W1 and W2 in the well known manner. Since there is no mechanism provided for restraining the return pivotal motion of the lever release arm 22 from its counterclockwise position to which it is rotated, the tension on the cables 24 and 26 will become slack, the slackness being transmitted through cables 32, 34, 36 and 38, thereby releasing the locking mechanism for each of the illustrated extendible booms 12, 14, 16 and 18. Again, it should be understood that any well known locking mechanism and boom configuration therefor are to be used, and do not constitute a specific part of the present invention.

With reference again to FIGS. 3 and 4, the second crank arm 98 provides a redundant release mechanism for pivoting the lever release arm 22 in a counterclockwise direction should the squibs 138 fail to operate. As the satellite reaches its intended orbit in the upper atmosphere environment, the subliming material 182 contained within the piston housing 152 dissipates at a controlled rate through the purposely sized orifice 190 provided in the end plug 186 of the piston housing 152. As the material 182 escapes, the piston 174 is retracted by the action of the coil spring 180 to fill the empty space created due to escape of some of the subliming material 182. The rate at which the piston is retracted can be precisely timed by controlling the size of the orifice 190 which determines the rate at which the subliming material 182 escapes to the low atmosphere environment. When the piston 174 has been retracted a proper amount, the head 176 of the piston will be slidably removed from the bearing surface 116 provided on the extended arms 104 and 106 of the crank arm 98. Accordingly, the compressed coil spring 146 will expand, thereby transferring its stored energy to the crank arm 98, causing it to rotate generally to the position shown in phantom at 206 in FIG. 3.

With reference to FIG. 5, the shoulder 124 provided at the bottom portion 120 of the crank arm 98 impinges against the shoulder 90 provided on the top portion of the hub 74 of the rotatable shaft 56. Accordingly, upon rotation of the crank arm 98 in a counterclockwise direction, as viewed in each of the FIGS. 3 and 5, the rotatable shaft 56 will also be caused to rotate due to the impinging surfaces of shoulders 124 and 90. Upon such rotation of the shaft 56, the lever release arm 22, which is secured as described to the bolt head 60, will be caused to rotate in a counterclockwise direction by the purely mechanical actuation system provided by the crank arm 98 and the structure associated therewith. Although the purely mechanical system described is specifically designed as a redundant release mechanism to be used upon failure of the squibs 138 to fire, it should be understood that such mechanical actuation system will operate even though the squibs do fire.

For example: a more precise control of the escape rate of the subliming material 182 can be obtained. The piston housing 152 may be capped by a pop-off cover, not shown. Accordingly, air under atmospheric pressure will be retained in the space provided by the orifice 190 and the enlarged aperture 192 of the end plug 186. The subliming material 182 is prevented from escaping therethrough, allowing the housing 20 to be properly assembled on the spacecraft 10. Upon launch of the spacecraft 10, the subliming material 182 will be retained within the capped piston housing 152. Upon reaching the upper atmosphere, the environment will be of substantially less atmospheric pressure than the air stored within the orifice 190 and the enlarged opening 192 of the end plug 186. The air thus stored will then create a pressure differential across the pop-off cap, thereby forcing the cap off the piston housing 152. The retained air will thus escape to the outer atmosphere environment exposing the subliming material 182 which will then begin to escape at a controlled rate through the orifice 190. In this manner, the escape rate of the subliming material 182 and, consequently, the retraction of the piston 174 may be controlled with the required precision.

Although preferred embodiments of the invention have been specifically described and shown in detail, it should be understood that other numerous modifications and advantages attendant to said invention are contemplated, and the invention should not be restricted to the embodiments

We claim:

1. A redundant actuating mechanism comprising: a housing, shaft mounted for rotation in said housing and having an end portion protruding from said housing, a lever arm fixedly secured to the protruding end portion of said shaft, said housing including a plurality of land portions, said shaft being provided with extended arms initially impinged against said land portions, a squib mounted in the housing adjacent one of said extended arms of said shaft, which squib impinges against said one of said extended arms, said shaft and said lever arm being rotated upon firing of said squib, a crank arm interlockingly mounted on said shaft, mechanical means associated with said crank arm for positively rotating said crank arm, said shaft and said lever arm should said squib fail to fire.

2. The structure as recited in claim 1, and further including timing means for delaying positive rotation of said crank arm for a predetermined time period.

3. The structure as recited in claim 2, further including a second squib mounted in the housing adjacent to the other of said extended arms and wherein said timing means includes a piston housing, a piston slidably mounted in said piston housing, a portion of said piston protruding therefrom and initially restraining said crank arm from rotation, and a subliming substance partially filling said piston housing, said piston being retracted within said piston housing upon subliming of said subliming substance, thereby freeing said crank arm for positive rotation by said mechanical means.

4. The structure as recited in claim 1, wherein said mechanical means includes an energy storage device mounted in said housing and operatively adjacent said crank arm.

5. The structure as recited in claim 4, wherein said crank arm is provided with an extended arm and said energy storage means includes a compressed spring abutting said extended arm.

6. The structure as recited in claim 5, and further including timing means mounted on said housing for initially restraining rotation of said crank arm against the action of said compressed spring and for delaying positive rotation of said crank arm for a predetermined time period.

7. The structure as recited in claim 6, wherein said timing means includes a retractable piston initially overlying a portion of said crank arm, a piston housing slidably receiving said piston, a subliming substance in said piston housing, said piston being slidably retracted within said piston housing upon escape of said subliming substance from said piston housing.

8. The structure as recited in claim 7, wherein said piston housing is provided with an orifice particularly sized to control the escape rate of said subliming substance.

9. A mechanical actuation system including:
a housing;
a crank arm mounted for rotation in said housing;
a compressed spring mounted in said housing and abutting said crank arm;
a piston housing provided on said housing;
a piston slidably received by said piston housing; said piston overlying a portion of said crank arm and restraining it against the action of said compressed spring;
a subliming substance within said piston housing; and
means on said piston housing allowing controlled escape of said subliming substance, said piston being retracted within said piston housing and thereby freeing said crank arm for positive rotation by said compressed spring.